US012660755B2

(12) United States Patent
Hunt et al.

(10) Patent No.: US 12,660,755 B2
(45) Date of Patent: Jun. 23, 2026

(54) HARVESTER REEL HAVING ADJUSTABLE TINE BARS AND METHOD FOR RESETTING SAME

(71) Applicant: CNH Industrial America LLC, New Holland, PA (US)

(72) Inventors: Cory Hunt, Millersville, PA (US); Jeffrey Trowbridge, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 775 days.

(21) Appl. No.: 17/901,065

(22) Filed: Sep. 1, 2022

(65) Prior Publication Data

US 2024/0074353 A1 Mar. 7, 2024

(51) Int. Cl.
*A01D 57/12* (2006.01)
*A01D 34/14* (2006.01)

(52) U.S. Cl.
CPC .............. *A01D 57/12* (2013.01); *A01D 34/14* (2013.01)

(58) Field of Classification Search
CPC ........ A01D 57/12; A01D 34/14; A01D 57/02; A01D 57/03
See application file for complete search history.

(56) References Cited

U.S. PATENT DOCUMENTS

| | | | |
|---|---|---|---|
| 1,794,646 A | 3/1931 | Schueler | |
| 3,733,796 A * | 5/1973 | Wood | ..................... A01D 43/10 |
| | | | 56/226 |
| 2002/0148210 A1 | 10/2002 | Bickel | |

| | | | |
|---|---|---|---|
| 2017/0311546 A1 * | 11/2017 | Jost | ......................... A01D 57/04 |
| 2020/0178464 A1 * | 6/2020 | Talbot | .................... A01D 57/12 |
| 2020/0256437 A1 * | 8/2020 | Lehman | ................. F16H 53/06 |

FOREIGN PATENT DOCUMENTS

| | | | | |
|---|---|---|---|---|
| AU | 2014202792 B2 | | 12/2015 | |
| BR | 112020008293 B1 * | | 10/2023 | ............. A01D 34/04 |
| CN | 118844213 A | * | 10/2024 | |
| WO | WO-2019234539 A1 * | | 12/2019 | .......... A01D 34/283 |
| WO | WO-2021062552 A1 * | | 4/2021 | ............. A01D 34/04 |

OTHER PUBLICATIONS

Translation of Document WO-2021062552-A1 as retrieved on May 7, 2025.*
Translation of Document WO-2019234539-A1 as retrieved on May 7, 2025.*
Translation of Document BR-112020008293-B1 as retrieved on May 7, 2025.*
Translation of Document CN-118844213-A as retrieved on May 7, 2025.*

* cited by examiner

*Primary Examiner* — Joseph M Rocca
*Assistant Examiner* — Jose Antonio Martinez
(74) *Attorney, Agent, or Firm* — Buchanan Ingersoll & Rooney PC

(57) ABSTRACT

A harvester reel for an agricultural harvester header includes a central rotatable shaft; a plurality of reel tine bars and a cam assembly for guiding rotation of the plurality of reel tine bars. The reel tine bars extend widthwise across the reel and are connected to the central rotatable shaft for rotation therewith. Each of the plurality of reel tine bars include a tine. The cam assembly includes a cam and a diverter adjacent the cam. The diverter is movable between a disengaged position, in which the cam does not guide rotation of the tine bars, and an engaged position, in which the cam does guide rotation of the tine bars. The diverter is biased toward the engaged position.

20 Claims, 15 Drawing Sheets

HARVESTER REEL HAVING ADJUSTABLE TINE BARS AND METHOD FOR RESETTING SAME

BACKGROUND OF THE INVENTION

The present disclosure relates generally to a harvester reel for an agricultural harvester header having adjustable tine bars.

Harvester reels are used on agricultural harvesters to guide crops to a cutting apparatus, e.g., a cutterbar. Reel-cutterbar interference is a well-known problem in harvester headers equipped with a flexible cutterbar or a cutterbar that can move vertically with respect to the reel. If the cutterbar flexes upwardly far enough it can cut plastic reel tines or experience damage if it comes into contact with metal reel tines. Shortened plastic tines can be very costly to replace in wider headers due to the sheer number of tines that must be replaced, and cutterbar damage caused by metal tines can result in significant harvester downtime.

Described herein is a method for deploying and resetting the tines to prevent contact between the tines and the cutterbar.

SUMMARY OF THE INVENTION

In accordance with an exemplary embodiment, the present disclosure provides a harvester reel for an agricultural harvester header includes a central rotatable shaft; a plurality of reel tine bars and a cam assembly for guiding rotation of the plurality of reel tine bars. The reel tine bars extend widthwise across the reel and are connected to the central rotatable shaft for rotation therewith. Each of the plurality of reel tine bars include a tine. The cam assembly includes a cam and a diverter adjacent the cam. The diverter is movable between a disengaged position, in which the cam does not guide rotation of the tine bars, and an engaged position, in which the cam does guide rotation of the tine bars. The diverter is biased toward the engaged position.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings exemplary embodiments. It should be understood, however, that the subject disclosure is not limited to the precise arrangements and instrumentalities shown. In the drawings.

DETAILED DESCRIPTION OF THE DRAWINGS

Figure 1:
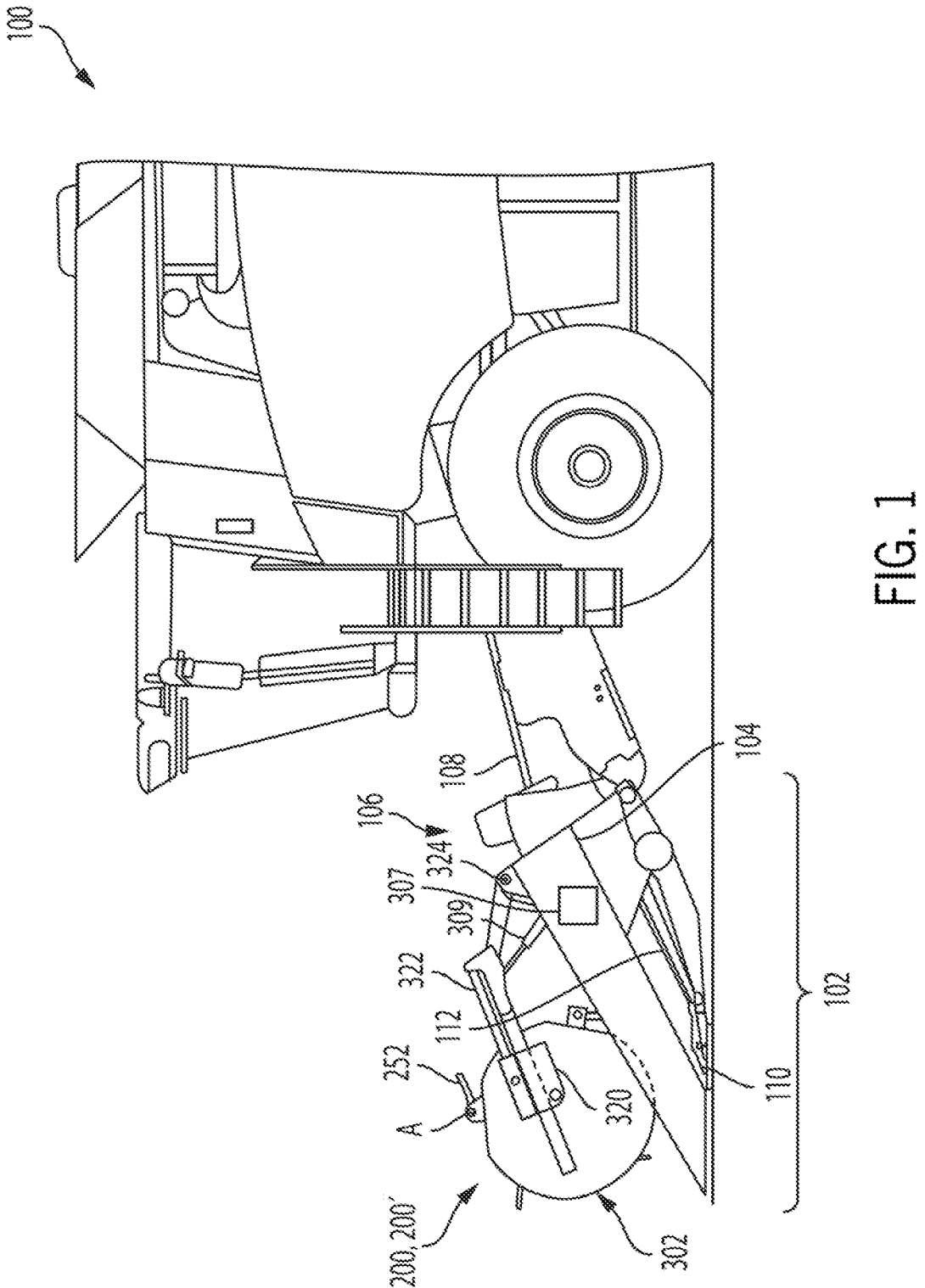
FIG. 1 is a side elevation view of an agricultural harvester in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the subject disclosure. The agricultural harvester e.g., a combine harvester 100, includes a header 102 having a chassis or frame 104 that is attached to a forward end 106 of the harvester. The header 102 is configured to cut crops with a cutterbar 110 as the harvester 100 moves forward over a crop field. It is appreciated that the cutterbar 110 includes one or more reciprocating sickles, such as those disclosed in U.S. Pat. No. 8,151,547, the entire disclosure of which is incorporated herein by reference for all purposes. The header includes a harvester reel 200, 200' and one or more draper belts, including draper belt 112 for moving crop materials towards a feederhouse 108.

Figure 2:
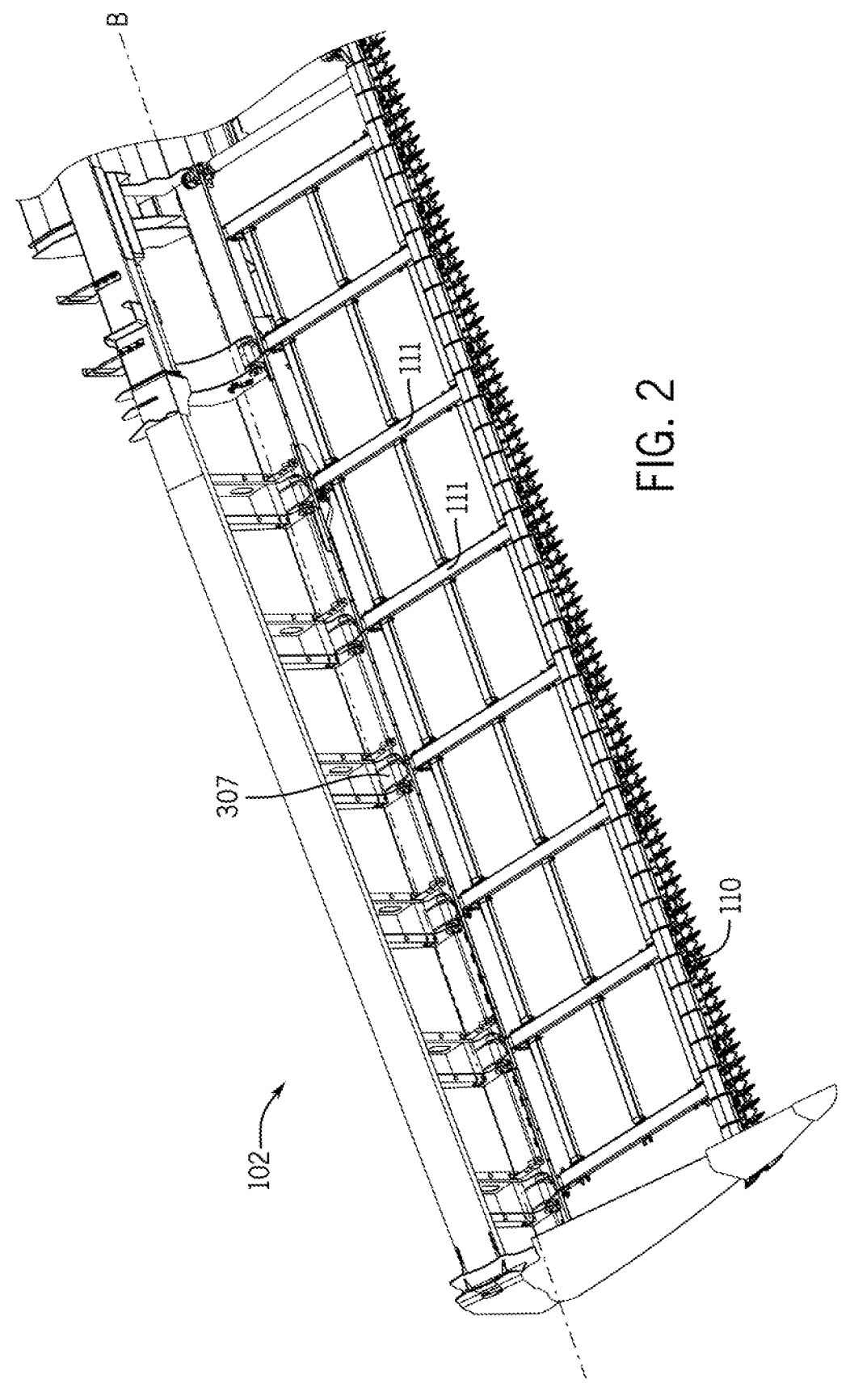
FIG. 2 is an isometric view of a portion of a header of the agricultural harvester of FIG. 1, whereby various components are omitted to reveal the flex arms of the header.

FIG. 2 depicts a portion of header 102 of harvester 100. Header 102 includes a frame, and a plurality of longitudinally extending flexible arms 111 mounted to the frame. Specifically, one end of each flex arm 111 is mounted to the frame, and the opposite end of each flex arm 111 is mounted to flexible and reciprocating cutterbar 110. Each flex arm 111 is rotatable mounted to the frame about axis B, such that the arms 111 can move as cutterbar 110 flexes upwardly and downwardly. Draper belt 112, which is omitted from FIG. 2, is supported both above and beneath flex arms 111, as is known in the art. Sensors 307 track the rotation (or position) of each flex arm 111; and that information is used to calculate the vertical position of cutterbar 110 with respect to the frame (or other stationary point). Specifically, because the length of a flex arm 111 is known and the degree of rotation of that flex arm 111 is sensed by sensor 307, the vertical position of the portion of cutterbar 110 that is mounted to that flex arm 11 can be determined using simple geometry. Alternatively, sensors 307 may be mounted to frame for monitoring the position of cutterbar 110 along its length. As yet another alternative, sensors 307 may be mounted along the length of the cutterbar 110 for monitoring the bending action of cutterbar 110 to thereby determine the vertical position of cutterbar 110 relative to the frame. It should be understood that various ways exist for determining the vertical position of cutterbar 110.

Sensors 307 may track the position of cutterbar 110 (based upon the position of flex arm 111), as described above. Alternatively, sensors 307 may track the position of reel 200, 200'. As another alternatively, sensors may track the gap between cutterbar 110 and reel 200, 200'. As yet another alternative, sensors 307 may track the position of cutterbar 110 (based upon the position of flex arm 111) and the position of reel 200, 200'. Each sensor 307 may be a rotary encoder (for detecting rotation), a potentiometer, an optical sensor, a Hall-effect sensor, a magnet, a switch, a magnetic sensor or any other type of sensor known to those skilled in the art for detecting movement.

The harvester reel 200, 200' is mounted on the header 102 and generally spans laterally or widthwise of the header. The harvester reel includes a central rotatable shaft or axle 202. A plurality of reel tine bars 206 extend widthwise across the reel and are connected to the central rotatable shaft for rotation therewith. Each of the plurality of reel tine bars is rotatable and includes a biasing member 250 (FIGS. 6 and 7) for biasing the reel tine bar about its central longitudinal axis "A" (FIG. 1) and at least one tine 252 for gathering and directing crop downwardly and rearwardly into the header 102 for subsequent cutting and harvesting operations. As shown in FIGS. 4, 5, 8 and 11, the harvester reel further includes a primary tine bar guiding mechanism 1000 configured to guide rotation of the tine bars during rotation of the central rotatable shaft, and a secondary tine bar guiding mechanism 1100 configured to guide rotation of the tine bars during a portion of a complete revolution of rotation of the central rotatable shaft. According to exemplary "cam reel" embodiments of the subject disclosure, the primary and secondary tine bar guiding mechanisms are incorporated into a cam assembly 300 (FIGS. 4 and 5) or 400 (FIGS. 8 and 11) at a lateral end of the harvester reel for guiding rotation of the plurality of tine bars.

The central rotatable shaft 202 is an axle powered by the header 102 to drive operations of the harvester reel. The central rotatable shaft supports the harvester reel and rotates about a longitudinal axis of the harvester reel.

Figures 4, 5:
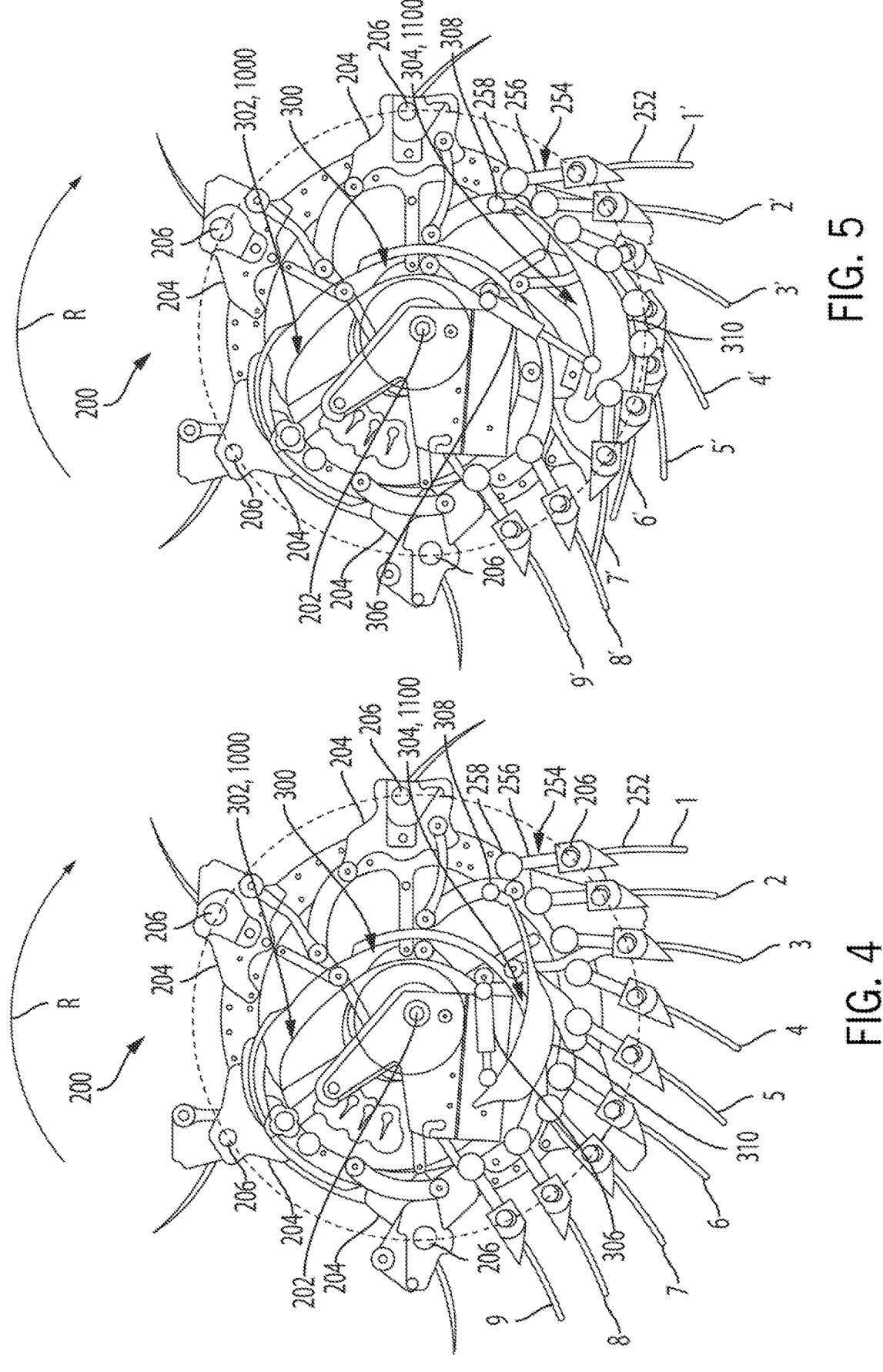
FIG. 4 is an external end view of a secondary cam of a reel cam assembly of a harvester reel in accordance with an exemplary embodiment of the subject disclosure in a disengaged position.
FIG. 5 is an external end view of a secondary cam of a reel cam assembly of a harvester reel in accordance with an exemplary embodiment of the subject disclosure in an engaged position.
Figure 7:
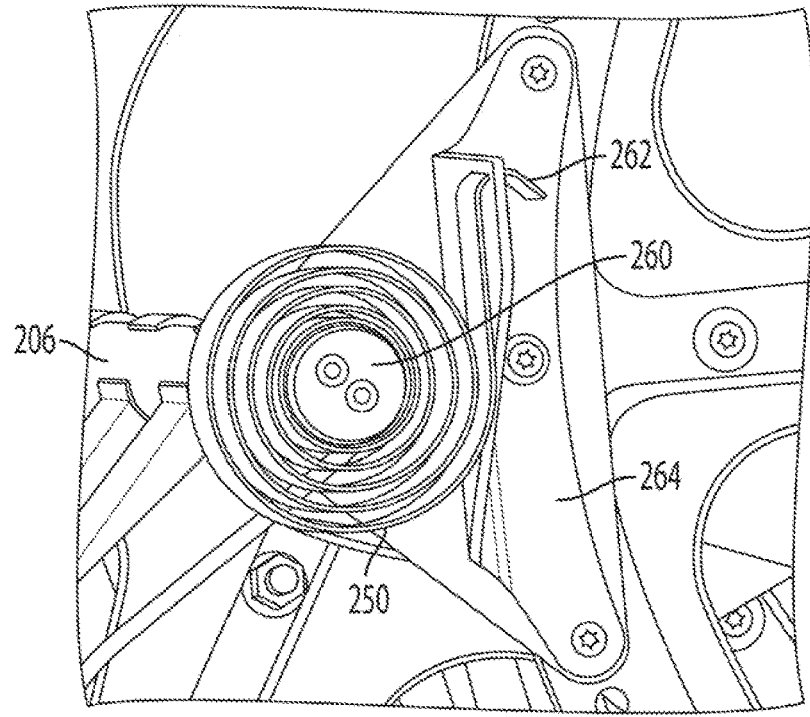
FIG. 7 is an enlarged perspective view of the end of the harvester reel shown in FIG. 6.

As best shown in FIGS. 4, 5 and 7, the plurality of tine bars 206 are circumferentially spaced about the central rotating shaft. The plurality of tine bars 206 extend lengthwise across the harvester reel and are connected to the central rotating shaft 202 via mounting brackets 204. Each of the mounting brackets 204 extend radially from the central rotating shaft 202. The harvester reel 200 is illustrated with six tine bars, however the harvester reel can include more or fewer than six tine bars, such as one, two, three, four, five, seven, eight, nine, ten, or more. FIGS. 4, 5, 8, 9, 11 and 12 illustrate that each of the plurality of tine bars includes a follower or cam follower 254 operatively attached to an end of the tine bar and extending substantially transverse to the central longitudinal axis of the tine bar. According to an aspect, each follower 254 comprises an elongated shaft or bracket 256 and a curved head 258, but can alternatively be a slider, a bearing, a bushing and the like suitable for the stated intended purpose. As described in greater detail below, when the follower moves or rotates it rotates or moves the tine bar to which it is connected.

Figure 6:
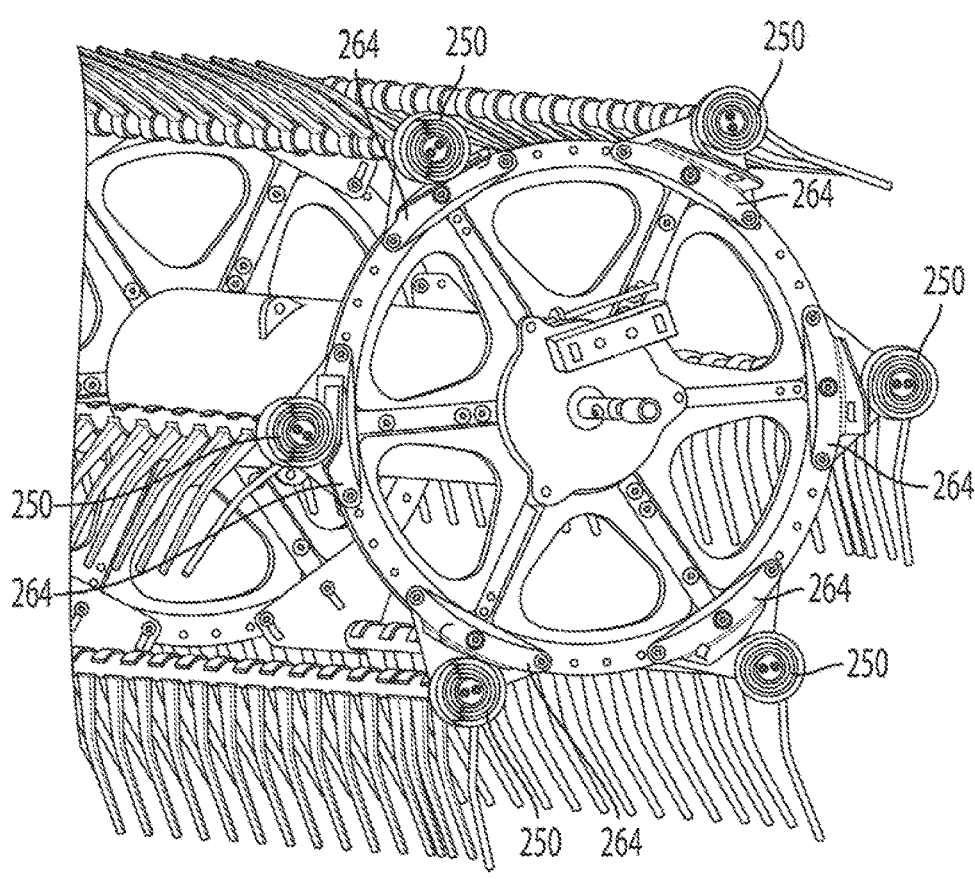
FIG. 6 is a perspective view of an end of a harvester reel in accordance with an exemplary embodiment of the subject disclosure.

As best shown in FIGS. 6 and 7, an end of each of the plurality of tine bars 206 includes the biasing member 250. As illustrated, the biasing member 250 is positioned at an end or lateral end of the reel opposite the end of the reel which carries the follower 254, although it is understood that the biasing member may be positioned at the same end of the reel which carries the follower 254 or any other suitable position along the length of the reel. According to an exemplary embodiment, the biasing member 250 is a torsion spring having a first end 260 affixed to the tine bar and a second end 262 engaged with a bracket 264 affixed to the reel. The biasing member can alternatively be an elastomer, a leaf spring, a coil spring, a gas spring and the like. As more fully described below, when the follower 254 is in an uncammed state, the biasing member 250 biases the tine bar to extend substantially radially outwardly from the perimeter of the harvester reel. In other words, the biasing member biases the tine bar to position the tine to extend substantially transverse to a tangent of a circumference defined by rotation of the tine bar about the central rotating shaft 202. Conversely, when the follower 254 is in a fully cammed state, the bias of the biasing member is overcome whereby the tine bar extends substantially tangentially to the perimeter of the harvester reel, or in other words the longitudinal axis of the tine extends at an acute angle relative to a circumference defined by rotation of the tine bar about the central rotating shaft 202.

The tines 252 are spaced apart along the length of each tine bar 206. According to exemplary embodiments, the tines can be fabricated from rigid material such as hard plastic or metal such as steel. The tines can range from about 3 to about 12 inches in length depending on the crop being harvested.

Referring again to FIG. 1, there is shown a primary cam 302 of a cam-type harvester reel, as well as structure for maintaining the primary cam stationary during rotation of the harvester reel 200. In particular, a bracket 320 is affixed to the cam 302 by unillustrated fasteners such as bolts, rivets, or the like. A distal portion of a reel lift arm 322 is secured to the bracket 320 and a proximal end of the reel lift arm is pivotably connected at 324 to the header frame 104. The connections of the primary cam to the bracket and the reel lift arm prevent rotation of the primary cam during rotation of the reel. The reel lift arm is raised and lowered by a reel lift arm actuator 309 such as a hydraulic cylinder or the like.

Figure 3:
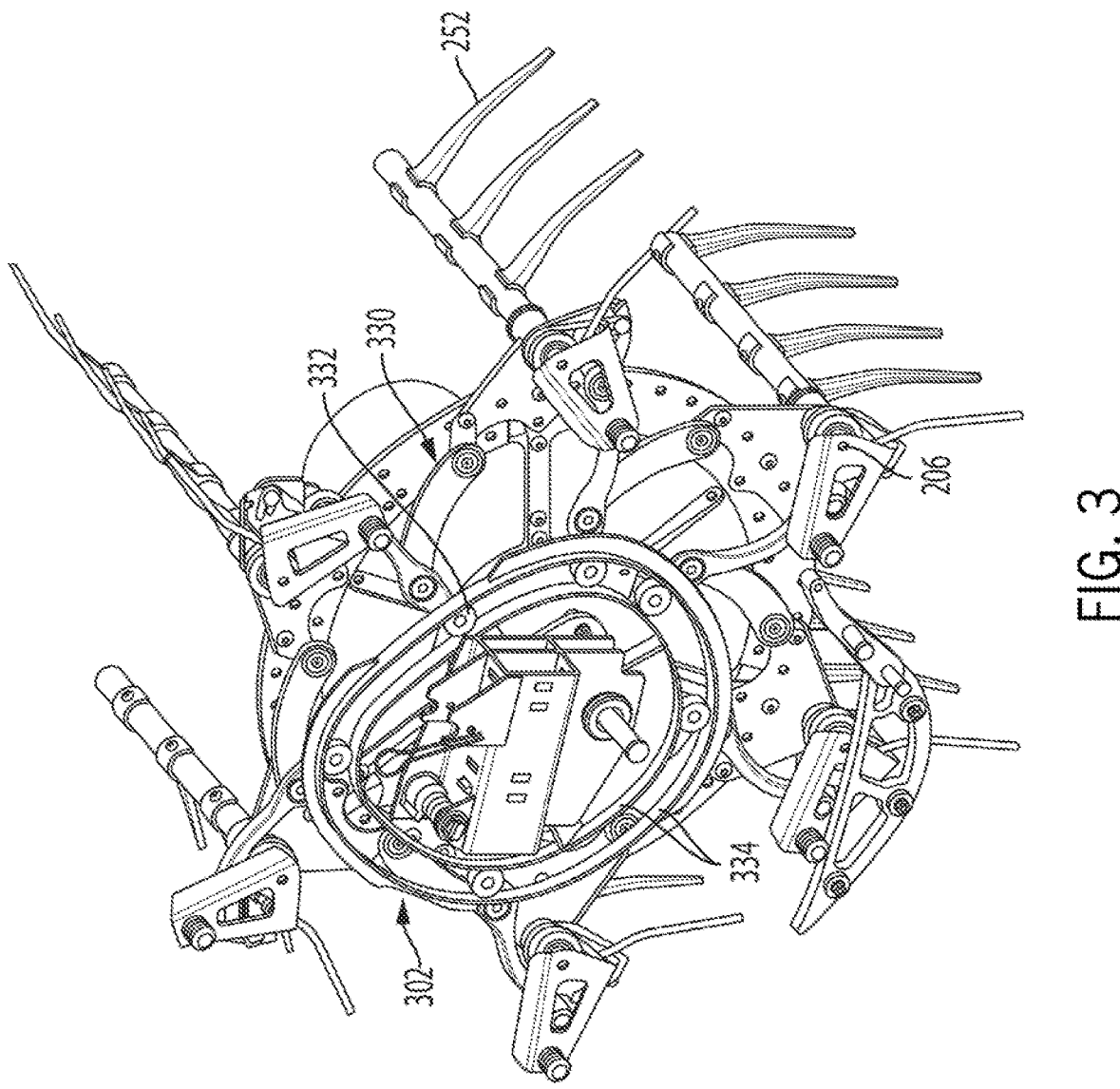
FIG. 3 is an external end view of a primary cam of a reel cam assembly of a harvester reel in accordance with an exemplary embodiment of the subject disclosure.

FIG. 3 shows a typical primary cam, such as primary cam 302. The non-circular shape of the primary cam dictates the degree to which the tine bars rotate during rotation of the central rotatable shaft 302, and thus the angle to which the tines 252 project from a circumference of the reel. In particular, each tine bar 206 has a respective linkage 330 that operatively links the tine bar with the primary cam 302. The linkage 330 includes a primary cam follower 332 that follows a cam track 334 of the primary cam as the reel rotates and moves the linkage with respect to the tine bar so as to rotate the tine bar about its longitudinal axis, thereby changing the angle the tines project from a circumference defined by rotation of the reel about the central rotatable shaft.

Referring to FIGS. 4 and 5, the harvester reel 200 is shown rotating in the direction of arrows "R". The cam assembly 300 includes the primary cam 302 for guiding rotation of the tine bars 206 during rotation of the central rotatable shaft 202. In addition, the cam assembly 300 includes a secondary cam 304 moveable between a disengaged position (FIG. 4) and an engaged position (FIG. 5). The harvester reel 200 additionally comprises an actuator 306 for moving the secondary cam between the disengaged and engaged positions. The actuator 306 can be a pneumatic, hydraulic, servo, electromechanical, mechanical actuator and the like capable of moving at sufficient speed to deploy the secondary cam 304 to cam the tine bars 206 and thus the tines 252 out of contact with the cutterbar 110 as the cutterbar rises in relation to the harvester reel.

The actuator is operatively in communication or configured to operatively communicate with sensors 307 (FIG. 1) for detecting a position of the cutterbar 110 with respect to the harvester reel. In this way, the sensor communicates the position of the cutterbar with respect to the harvester reel. If the sensor detects that the cutterbar position is above a certain elevation or a predetermined elevation position, then the actuator is activated to move the secondary cam to the engaged position. In addition, the sensor 307 can be configured to communicate with the reel lift arm actuator 309 (FIG. 1) to raise the harvester reel relative to the cutterbar when the cutterbar reaches a certain elevation or a predetermined elevation position. Alternatively, the actuator, sensor and reel lift arm may be operatively in communication with a controller (e.g., a computer controller/processor on the harvester or header) configured to control operation thereof based on predetermined parameters.

The secondary cam 304 is illustrated as being movable between first and second positions relative to the harvester reel. Specifically, the secondary cam is pivotably connected at pivot 308 to an unillustrated plate that is attached to the primary cam 302. It is understood, however, that the secondary cam can be supported to move in a linear fashion between the disengaged and engaged positions. The secondary cam 304 is positioned about a bottom region of the reel to facilitate camming of the tine bars such that they are retracted away from or otherwise disengaged from the cutterbar as the cutterbar comes into close proximity with the tines as further described below.

The secondary cam 304 includes a camming surface 310. FIG. 4 illustrates the secondary cam in the disengaged position whereby the camming surface 310 is out of contact with the curved heads 258 of tine bar followers 254. FIG. 4 also depicts nine positional instances (1-9) of a single tine bar follower approaching and passing the secondary cam 304. Under these circumstances, the tine bar follower 254 does not contact the camming surface 310 of the secondary cam 304 and the tine bar 206 is cammed or moved as dictated by the primary cam 302. As shown in FIG. 4, in the region of the secondary cam 304, the primary cam 302 cams the tine bar 206 such that the tine 252 extends substantially radially outwardly from the perimeter of the harvester reel.

FIG. 5 illustrates the secondary cam 304 in the engaged position wherein the actuator moves the secondary cam radially outwardly and the follower 254 of at least one of the plurality of reel tine bars 206 cams against the secondary cam. In other words, the secondary cam engages the follower of at least one of the plurality of reel tine bars pivoting the reel tine bar about its longitudinal axis. FIG. 5 also depicts nine positional instances (1'-9') of a single tine bar follower approaching, contacting and engaging the secondary cam 304. Under these circumstances, the curved head 258 of the tine bar follower 254 contacts the camming surface 310 of the secondary cam 304 in positional instances 2'-7' and the tine bar 206 is cammed as dictated by the shape of the camming surface 310 during that interval. As shown, the camming surface gradually cams the follower 254 from a position whereby the tine 252 extends substantially radially outwardly from the perimeter of the harvester reel (positional instance 2') to a position whereby the tine extends substantially tangentially to the perimeter of the harvester reel (positional instance 6') or at an acute angle relative to the perimeter of the harvester reel, to an uncammed position whereby the tine extends substantially radially outwardly from the perimeter of the harvester reel (positional instances 8' and 9'). In other words, in the engaged position, the secondary cam 304 overcomes the bias of the of the biasing member 250 in positional instances 2'-7' of the tine bar follower 254 and returns control to the biasing member at positional instances 8' and 9' of the tine bar follower, whereby the tine bar 206 and thus the tines 252 return to positions dictated by the shape of the primary cam 302. In the cammed positions, the overall length in which the tine extends radially outwardly from the reel is decreased thereby increasing the spacing distance of the tine from the cuter bar to prevent accidental engagement by the cutterbar.

Figure 8:
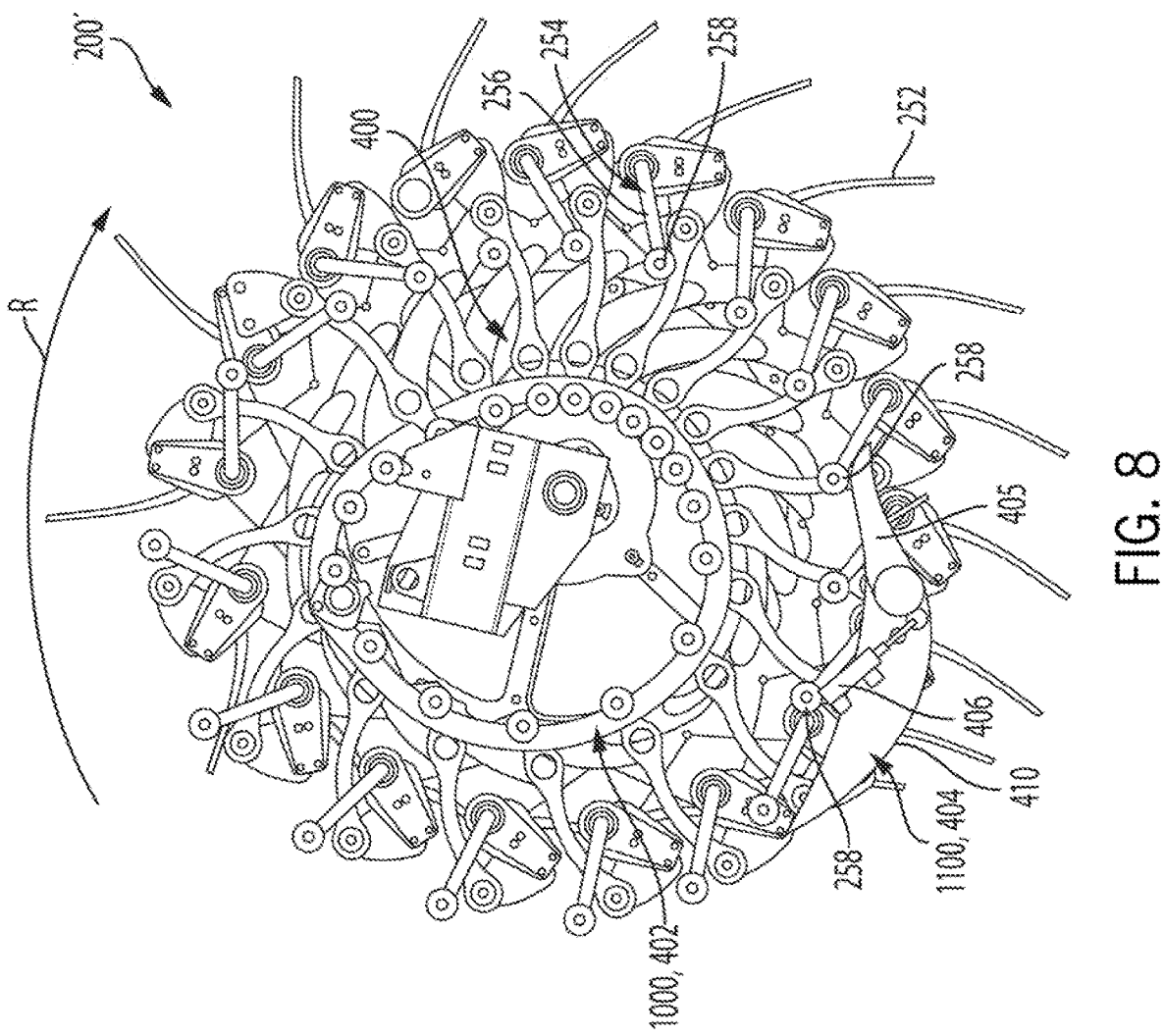
FIG. 8 is an external lateral end view of a diverter of a reel cam assembly of a harvester reel in accordance with another exemplary embodiment of the subject disclosure in a disengaged position.
Figure 10:
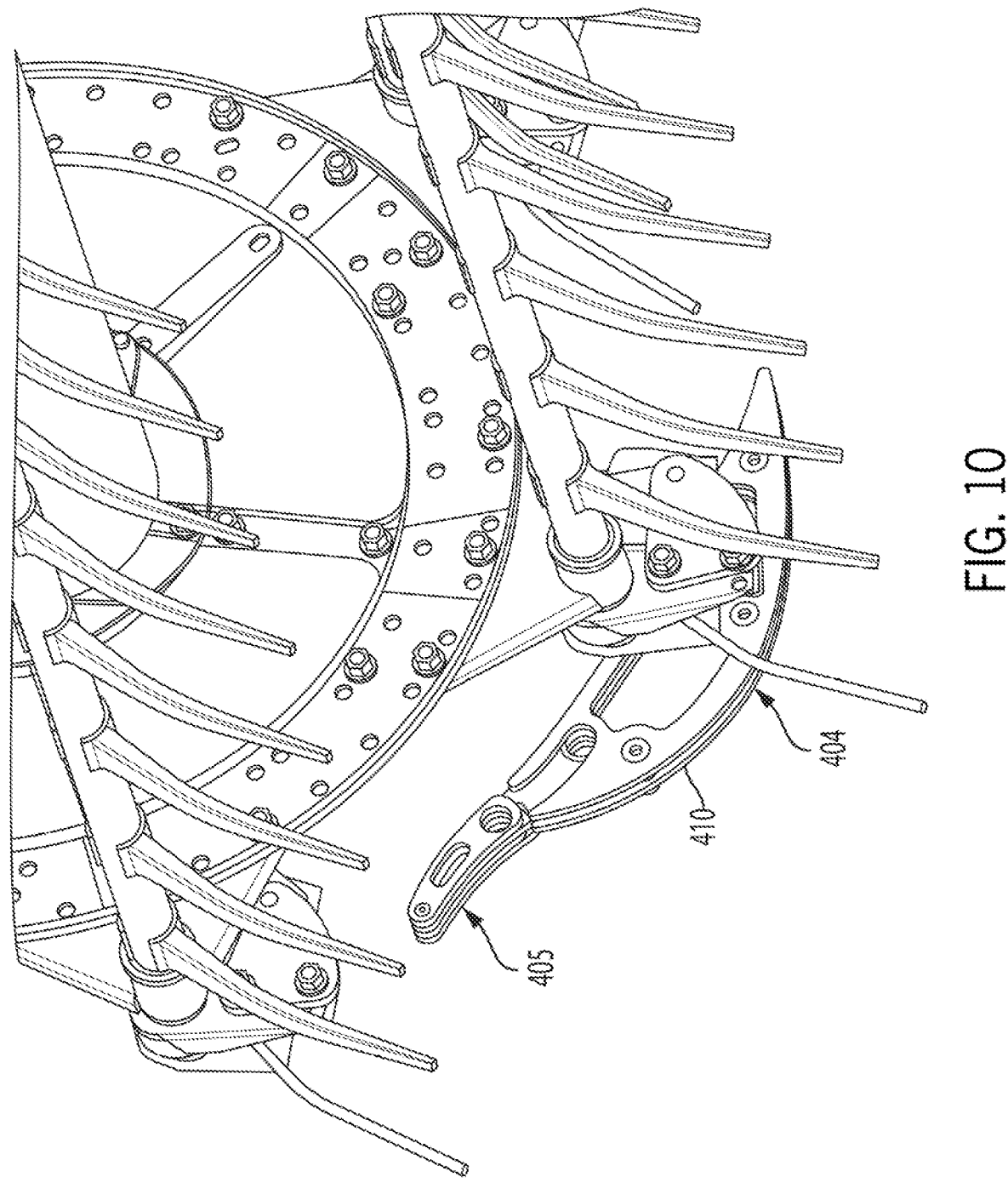
FIG. 10 is a partial perspective internal end view of the reel cam assembly of FIG. 9.
Figure 11:
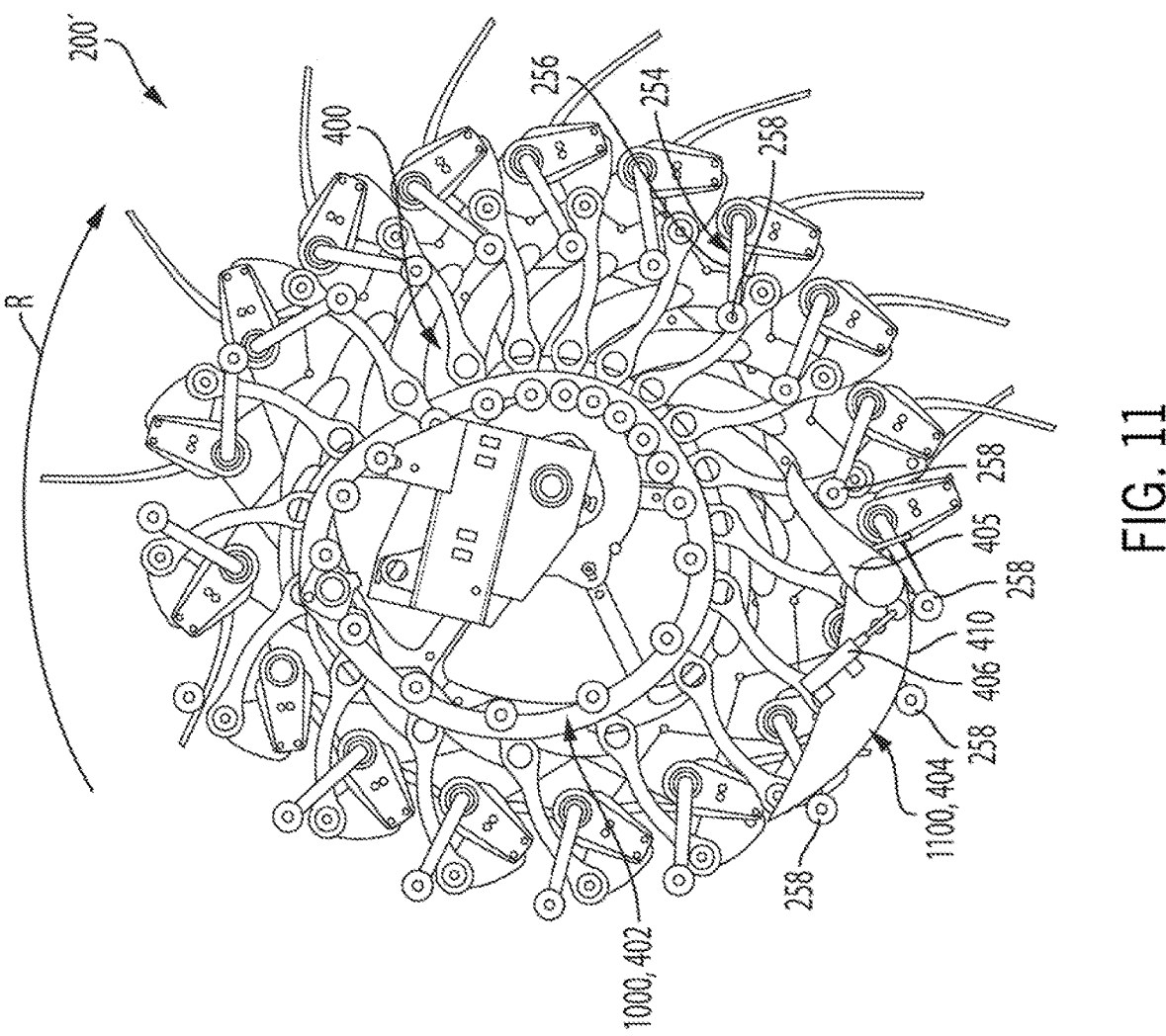
FIG. 11 is an external lateral end view of a diverter of a reel cam assembly of a harvester reel in accordance with another exemplary embodiment of the subject disclosure in an engaged position.
Figure 12:
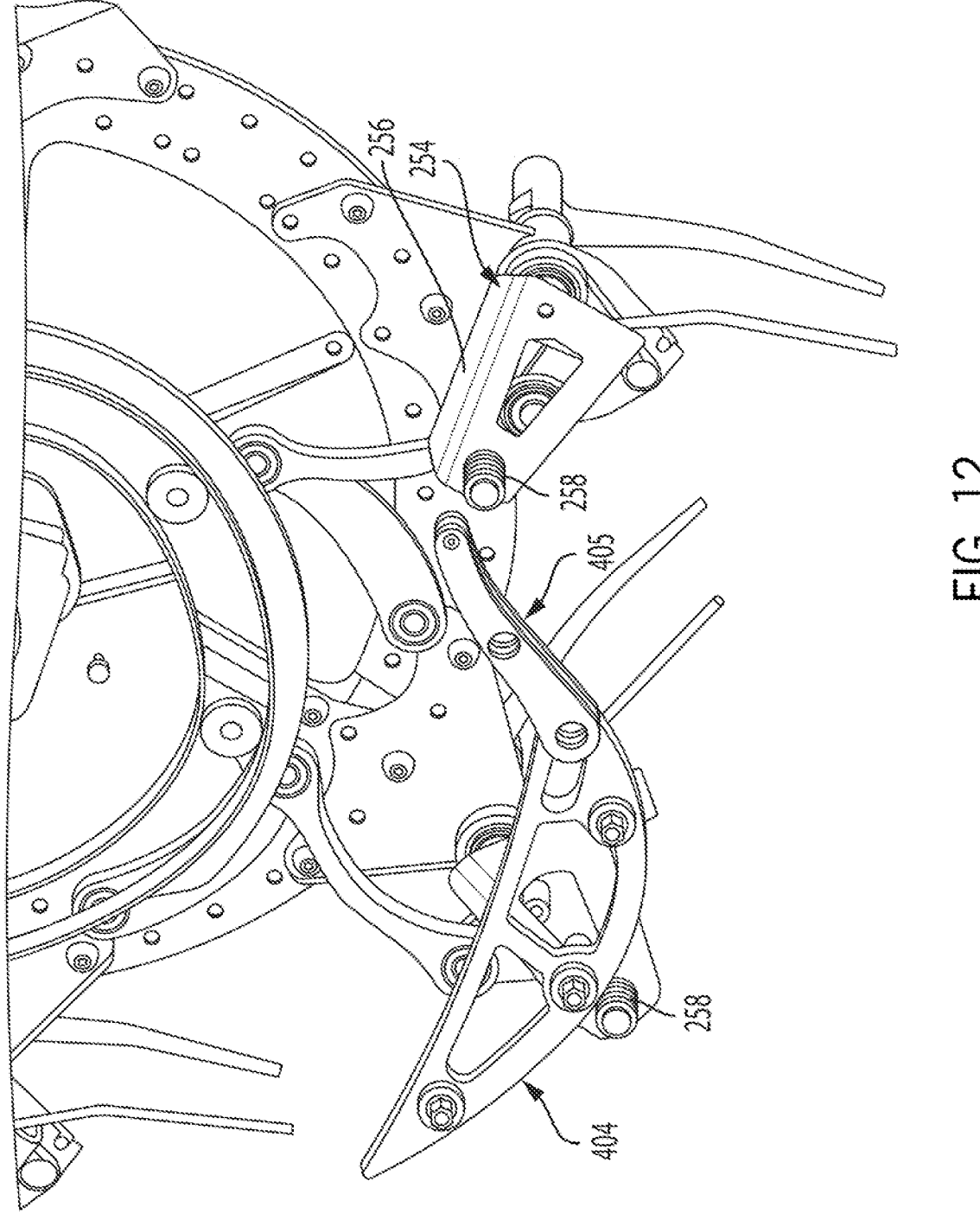
FIG. 12 is a partial enlarged external end view of the reel cam assembly of FIG. 11.
Figure 13:
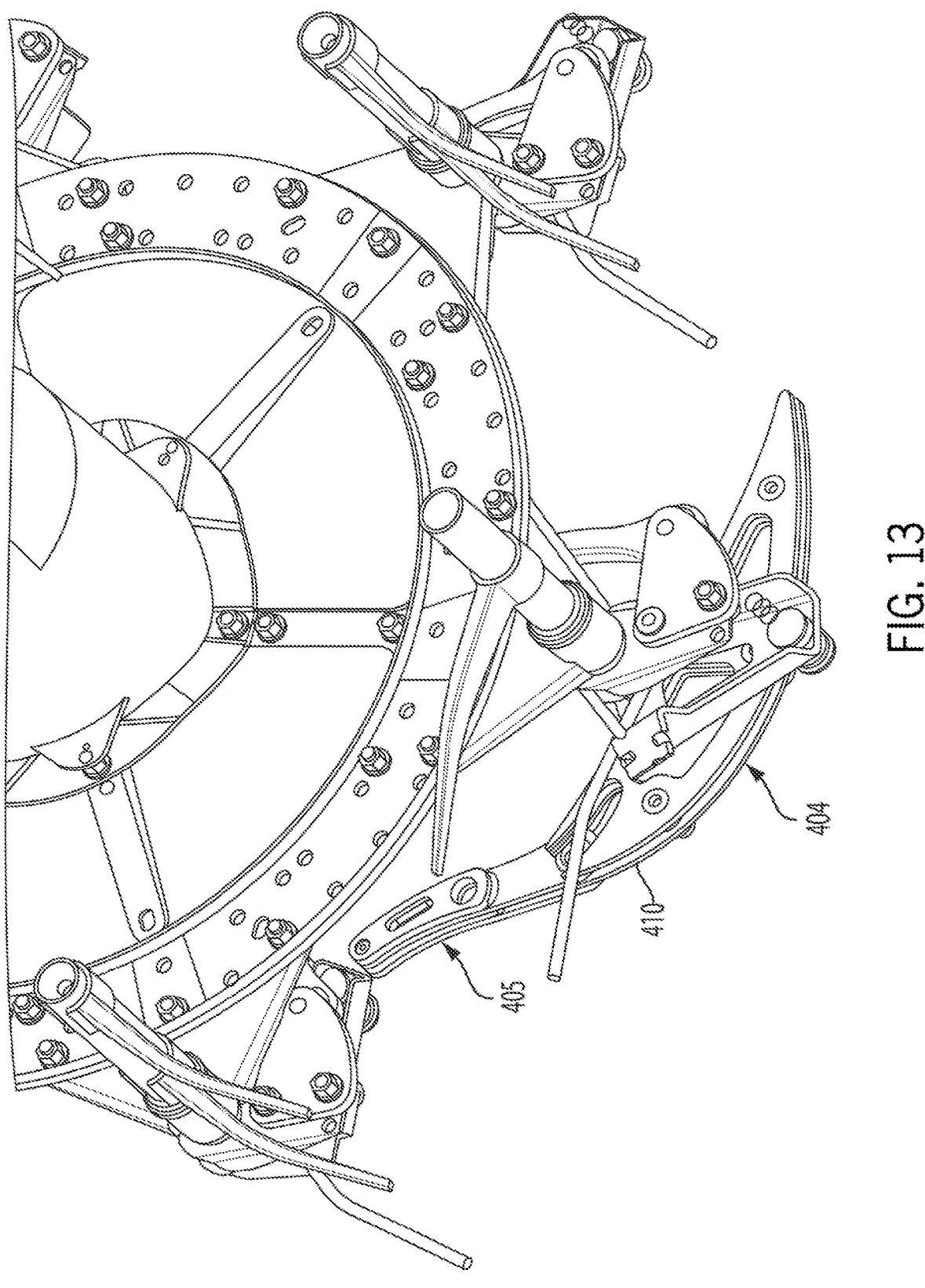
FIG. 13 is a perspective internal end view of the reel cam assembly of FIG. 12.

In accordance with another exemplary embodiment of the subject disclosure, FIGS. 8 and 11 illustrate a harvester reel 200' rotating in the direction of arrows "R", having a cam assembly 400. Cam assembly 400 includes a primary cam 402 similar to cam 302 for guiding rotation of the tine bars 206 during rotation of the central rotatable shaft 202. In addition, the cam assembly 400 includes a secondary cam 404 and a diverter 405 adjacent the secondary cam, wherein the diverter is moveable or pivotable between a disengaged position (FIGS. 8-10) and an engaged position (FIGS. 11-13). The secondary cam 404 and diverter 405 are positioned about a bottom region of the reel to facilitate camming of the tine bars such that they are disengaged or retracted as the cutterbar comes into close proximity with the tines as described below. The harvester reel 200' additionally comprises an actuator 406 (FIGS. 8 and 11) for moving the diverter between the disengaged and engaged positions. The actuator 406 can be a pneumatic, hydraulic, servo, electromechanical, mechanical actuator and the like capable of moving at sufficient speed to deploy the diverter to cam the tine bars 206 and thus the tines 252 out of potential contact with the cutterbar 110 as the cutterbar rises in relation to the harvester reel. Further details of actuator 406 are described with reference to FIGS. 14A-14C. The actuator is configured for operatively communicating with or operatively in communication with the sensor 307 (FIG. 1) for detecting a position of the cutterbar 110 with respect to the harvester reel. In this way, the sensor detects and communicates with the controller or the harvester operator the position of the cutterbar with respect to the harvester reel. If the sensor detects the cutterbar position is above a certain elevation or a predetermined position, then the actuator is activated to move the diverter to the engaged position. In addition, the sensor 307 can be configured to communicate with the reel lift actuator 309 (FIG. 1) such as a hydraulic cylinder or the like to raise the harvester reel relative to the cutterbar when the cutterbar reaches a certain elevation or a predetermined position.

Figure 9:
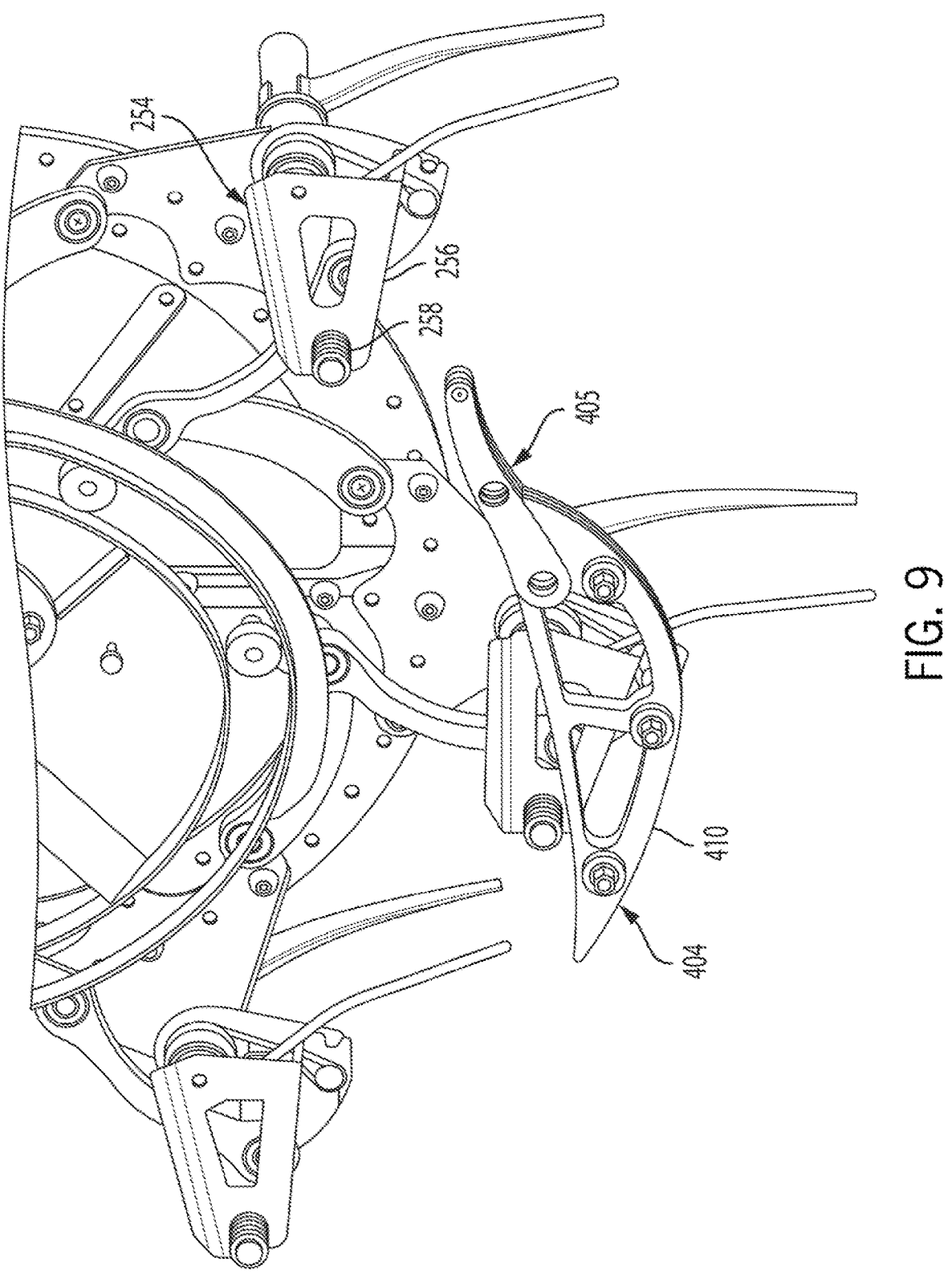
FIG. 9 is an enlarged lateral external end view of the reel cam assembly of FIG. 8.

The secondary cam 404 includes a camming surface 410 facing radially outwardly of the reel. FIGS. 8-10 illustrate the diverter 405 pivoted downwardly by the actuator 406 into the disengaged or non-engaging position whereby the diverter and the camming surface 410 are out of contact with the curved heads 258 of tine bar followers 254. In other words, the diverter is structured such that the curved heads of the tine bar followers pass by the diverter without engaging the diverter when the diverter is pivoted downwardly into the disengaged position. Under these circumstances, the tine bar follower 254 does not contact the diverter or the camming surface of the secondary cam and the tine bar 206 is cam med or moved as dictated by the shape of the primary cam 402. As shown in FIG. 8, in the region of the secondary cam 404, the primary cam 402 cams the tine bars such that the tines 252 extends substantially radially outwardly from the perimeter of the harvester reel.

FIGS. 11-13 illustrate the diverter 405 pivoted or moved upwardly into the engaged position wherein the follower 254 of at least one of the plurality of reel tine bars 206 contacts and cams against the diverter and the secondary cam upon rotation of the central rotatable shaft. In other words, the actuator 406 is operable to move or pivot the diverter from the disengaged or non-engaging position shown in FIGS. 8-10 to the engaged or engaging position of FIGS. 11-13 whereby the diverter engages the follower of at least one of the plurality of tine bars pivoting the tine bar about its longitudinal axis. Under these circumstances, the curved head 258 of the tine bar follower 254 contacts the upwardly pivoted diverter 405 and the camming surface 410 of the secondary cam 404 whereby the tine bar 206 is cammed as dictated by the shapes of the diverter 405 and the camming surface 410. As shown, the diverter and the camming surface gradually cam the follower 254 from a position whereby the tine 252 extends substantially radially outwardly from the perimeter of the harvester reel to a position whereby the tine extends substantially tangentially to the perimeter of the harvester reel or at an acute angle to the perimeter of the harvester reel. In other words, in the engaged position of the diverter 405, the diverter and the secondary cam 404 overcome the bias of the biasing member 250 to rotate the tine bars and thus move the tines 252 away from the cutterbar 110 creating a larger spacing between the tines and the cutterbar, thereby reducing or completely eliminating the potential for cutterbar engagement with the tines. When the diverter is returned to the disengaged position, the tine bar 206 and thus the tines 252 return under the bias of the biasing member to positions dictated by the shape of the primary cam 402.

Figure 14A:
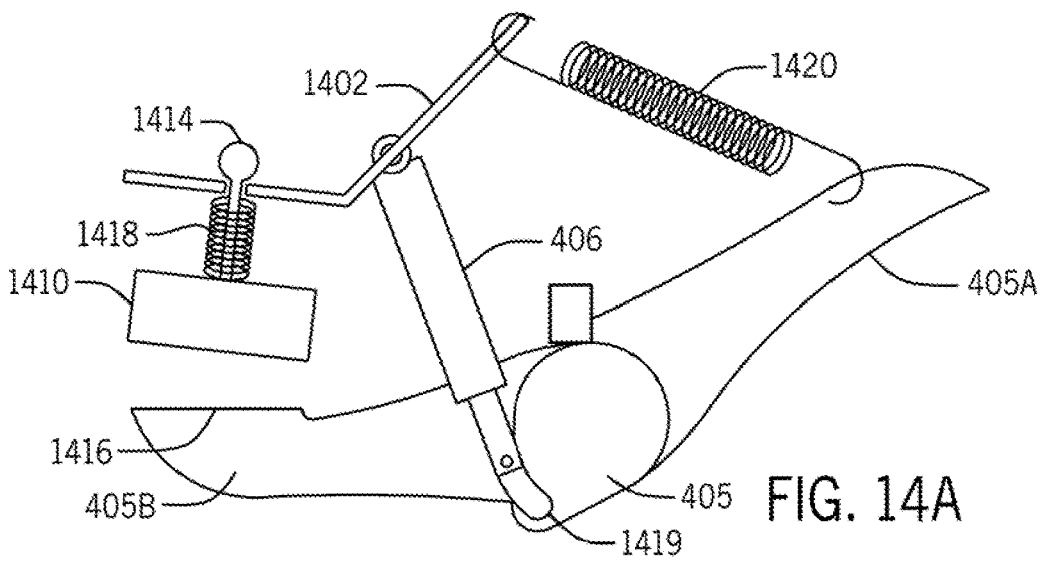
FIGS. 14A-14C are sequential schematic views of the operation of the diverter of FIG. 8 from the engaged position to the disengaged position.
Figure 14B:
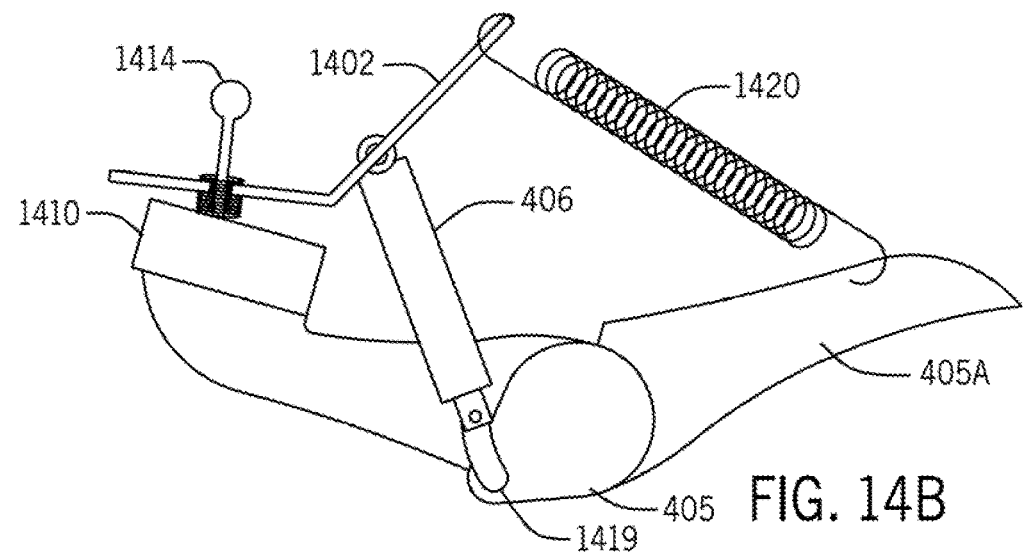
Figure 14C:
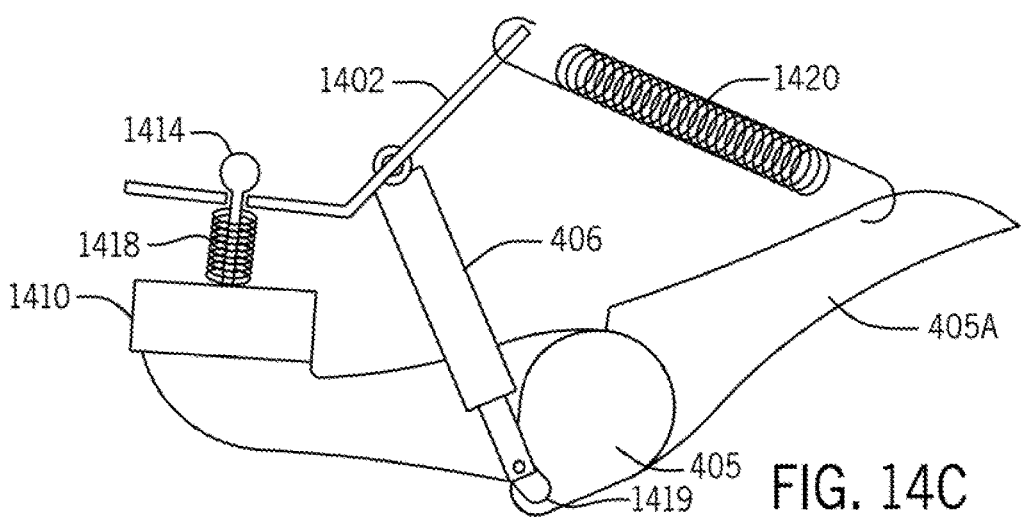

FIGS. 14A-14C depict an actuation system for moving diverter 405 from the engaged position (FIG. 14A) to the disengaged position (FIG. 14C). The position shown in FIG. 14B is an intermediate position.

Diverter 405 has two segments 405a and 405b that are pinned together. According to one aspect, segments 405a and 405b rotate together, but those segments do not rotate relative to one another. Segment 405a is the segment of diverter 405 that interacts with curved heads 258 of tine bar followers 254, as was described above. Segment 405b interacts with a magnet, as is described below. Diverter 405 is pivotably, slideably and/or movably attached to secondary cam 404, as shown in FIGS. 8-13. Alternatively, diverter 405 could form part of cam 404.

The actuation system for moving diverter 405 includes actuator 406, electromagnet 1410 and two springs 1418 and 1420. Turning now to the individual components of the system, actuator 406 is (optionally) a hydraulic actuator. Actuator 406 includes one end that is mounted to a stationary point or bracket 1402 of reel 200'. The free end of a movable piston, which is carried within a cylinder of actuator 406, is mounted in an elongated and curved slot 1419 that is formed in diverter 405. The slot 1419 may be spaced apart from the axis of rotation of diverter 405.

Electromagnet 1410 is electrically operable, and switchable between an active (magnetic) state and an inactive (non-magnetic) state. Magnet 1410 can be controlled by the same controller that controls actuator 406. Magnet 1410 has a post 1414 extending from a top surface thereof. The post 1414 has a ball at its free end. The post 1414 is positioned through an opening formed in bracket 1402. The ball at the end of post 1414 captivates electromagnet 1410 to bracket 1402 such that electromagnet 1410 may be movably and rotatably mounted to bracket 1402, as shown. Permitting movement of electromagnet 1410 with respect to diverter 405 and bracket 1402 enables electromagnet 1410 to shift in position for aligning with contact surface 1416 of the diverter 405 (see FIGS. 14B and 14C). Other methods for mounting electromagnet 1410 are envisaged. Compression spring 1418 is mounted around post 1414 and is positioned between the underside of bracket 1402 and the top side of electromagnet 1410. Spring 1418 biases magnet 1410 away from bracket 1402, as shown in FIG. 14A.

It should be understood that item 1402 is not limited to being a bracket, and could represent any feature of reel 200' that is stationary with respect to diverter 405.

Coiled tension spring 1420 has two ends and a coiled body positioned between the two ends. One end of spring 1420 is mounted to bracket 1402, and the other end of spring 1420 is mounted to segment 405a of diverter 405. Spring 1420 is biased to urge diverter 405 in a direction toward bracket 1402 (i.e., toward the engaged position of diverter). Spring 1420 is shown in the relaxed state in FIG. 14A, and in an expanded/extended state in FIGS. 14B and 14C.

As shown in FIG. 14C, electromagnet 1410 can be used to hold the loaded spring 1420 until engagement between diverter 405 and curved heads 258 of tine bar followers 254 becomes necessary. The magnet 1410 can either be "fail release" where energizing the magnet 1410 generates the holding force, or it can be "fail secure" where energizing the magnet 1410 counters a permanent magnetic field thereby eliminating the holding force.

Turning now to operation of the system for moving diverter 405, starting from the engaged position of diverter 405 shown in FIG. 14A (corresponding to the engaged position of FIG. 11), magnet 1410 is (optionally) deactivated, actuator 406 is in a fully extended position, and spring 1420 is in its normal relaxed state. Tension spring 1420 maintains diverter 405 in the engaged position.

To move diverter 405 to the intermediate position shown in FIG. 14B, the cylinder within actuator 406 is fully retracted, causing diverter 405 to rotate in the clockwise direction to the intermediate position shown in FIG. 14B. Magnet 1410 pivots slightly (with respect to bracket 1402) to make contact with surface 1416. Spring 1418 becomes compressed between the surfaces of magnet 1410 and bracket 1402. Magnet 1410 may or may not be activated (if not already activated) such that magnet 1410 is magnetically attracted to surface 1416 of diverter 405. Tension spring 1420 is expanded to a significant degree such that diverter 405 is biased in a direction toward bracket 402 (i.e., toward the engaged position of diverter 405). Diverter 405 is held in the position shown in FIG. 14B by virtue of actuator 406.

Turning now to FIG. 14C, magnet 1410 is activated (if not already activated) and, thereby, magnetically mounted to surface 1416. Actuator 406 is then fully extended causing the end of the cylinder within actuator 406 to travel along the length of the slot 1419 without rotating diverter 405 (a small degree of counterclockwise rotation is possible). Extending actuator 406 may permit spring 1418 to relax by a slight degree, as shown in FIG. 14C. Moving the cylinder to (or near) the bottom end of slot 1419 will enable rotation of diverter 405 in the counterclockwise direction back to the engaged position of FIG. 14A, as will be explained hereinafter.

To return diverter 405 to the engaged position of FIG. 14A from the disengaged position of FIG. 14C, electromagnet 1410 is deactivated, which causes (i) spring 1420 to move the segment 405A of diverter 405 toward bracket 1402, and (ii) magnet 1410 to separate from surface 1416 of diverter. Rotation of diverter 405 may be stopped by engagement between the actuator cylinder and the top end of slot 1419. Movement from the disengaged position of FIG. 14C to the engaged position of FIG. 14A may take 30 milliseconds, for example.

The time to reset the diverter ("405" from the engaged position to the disengaged position ("reset") is dependent on the reel speed, and space between tine bars 206 on the reel 200'. The diverter 405 must be reset within the window of time when the diverter 405 is not actively engaging one of the heads 458. This time is equal to the time between tine bars 206 or one-sixth of the time of one rotation of a six-tine bar reel. The reset time may be 140 milliseconds, for example.

Figure 15:
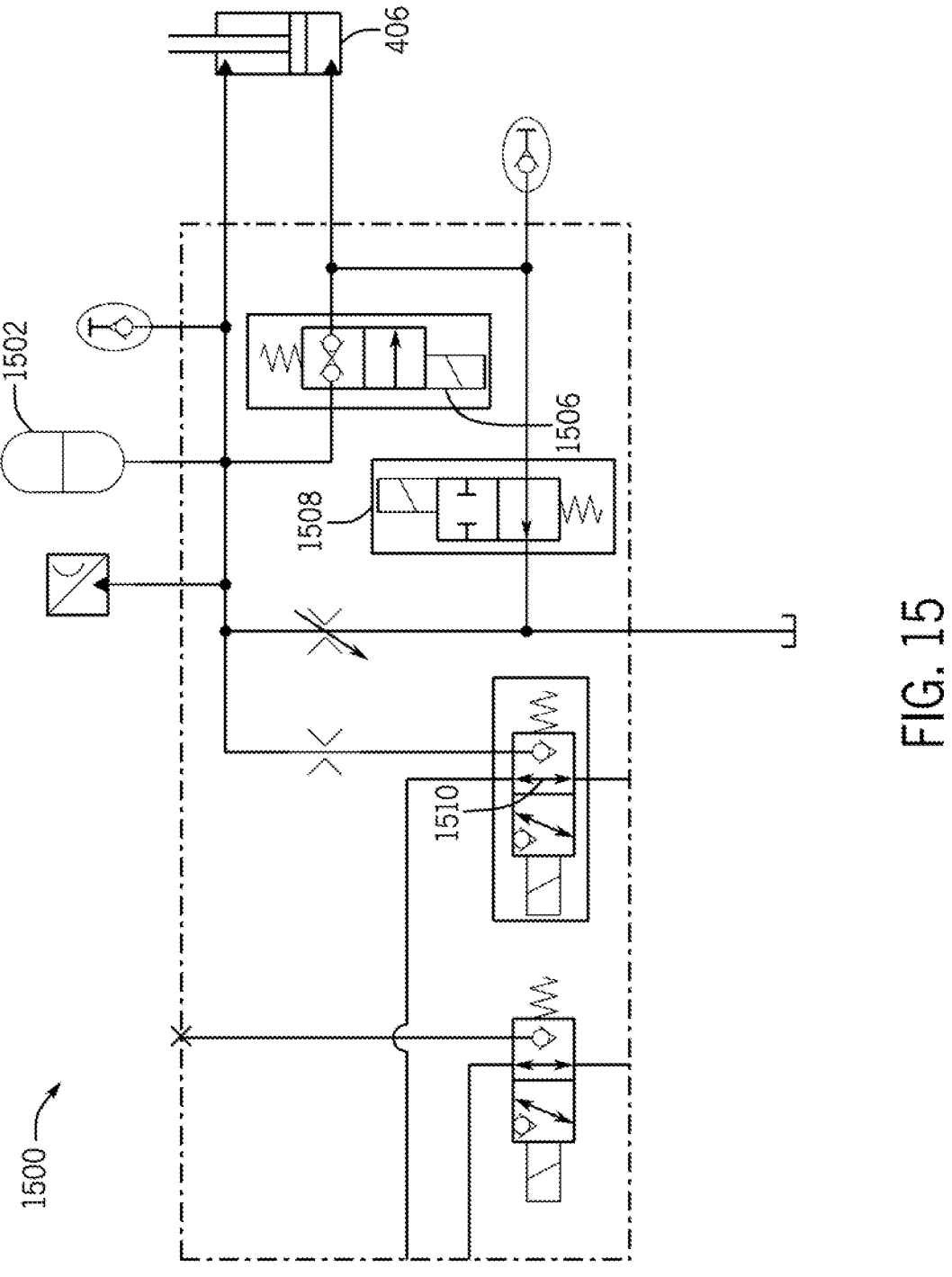
FIG. 15 is a hydraulic system for controlling the actuator for the diverter.

FIG. 15 depicts a hydraulic system 1500 for operating actuator 406. The hydraulic schematic shows how a regeneration-style circuit can be implemented to reduce the volume of oil needed for the reset action (i.e., resetting the diverter 405 from the engaged position to the disengaged position) to be equal to only the cylinder rod volume. By minimizing the oil volume needed for actuation, the actuation speed can be comparatively increased. It is important to note that the orientation of the actuation with respect to the diverter 405 can be modified to use either cylinder retraction or cylinder extension for the resetting action.

The accumulator 1502 of the system can be sized to supply multiple cycles of the actuator cylinder before the oil volume is depleted and the pressure is reduced below the minimum required for proper actuation speed. When a pressure sensor in the system 1500 measurement indicates the minimum pressure is reached, high pressure oil can be automatically diverted from a source on the header to quickly refill the accumulator 1502. High pressure oil could be potentially sourced from the reel fore/aft system of the header. The consequence may be that reel fore/aft would be momentarily disabled during refill.

Operation of the system would be performed as follows. Energize solenoids 1506 and 1508 to provide equal pressure to the cylinder rod and cap end of the double-acting cylinder causing the cylinder rod to extend. De-energize only solenoid 1506 so that the cylinder will be held in the extended position and ready for retraction. During this time, the system is free to engage at any time by releasing the magnet 1410. After the spring-loaded diverter 405 is released, solenoid 1508 can be de-energized causing a fast retraction of the cylinder rod. The cylinder would only briefly be retracted, which would allow enough time for the magnet 1410 to be energized. Thereafter, both solenoids 1506 and 1508 are again energized to return the cylinder rod to a retracted position. When this process occurs enough times to deplete the accumulator 1502 below a pressure threshold, solenoid 1510 is energized to quickly replenish oil volume in the accumulator 1502. The accumulator refill can happen simultaneous with any actions performed by the cylinder.

FIGS. 16A-16D illustrate sequential schematic views of the operation of a tine bar 206 in accordance with an exemplary embodiment of the subject disclosure as a cutterbar 110 approaches and moves away from a harvester reel.

Figures 16A, 16B, 16C, 16D:
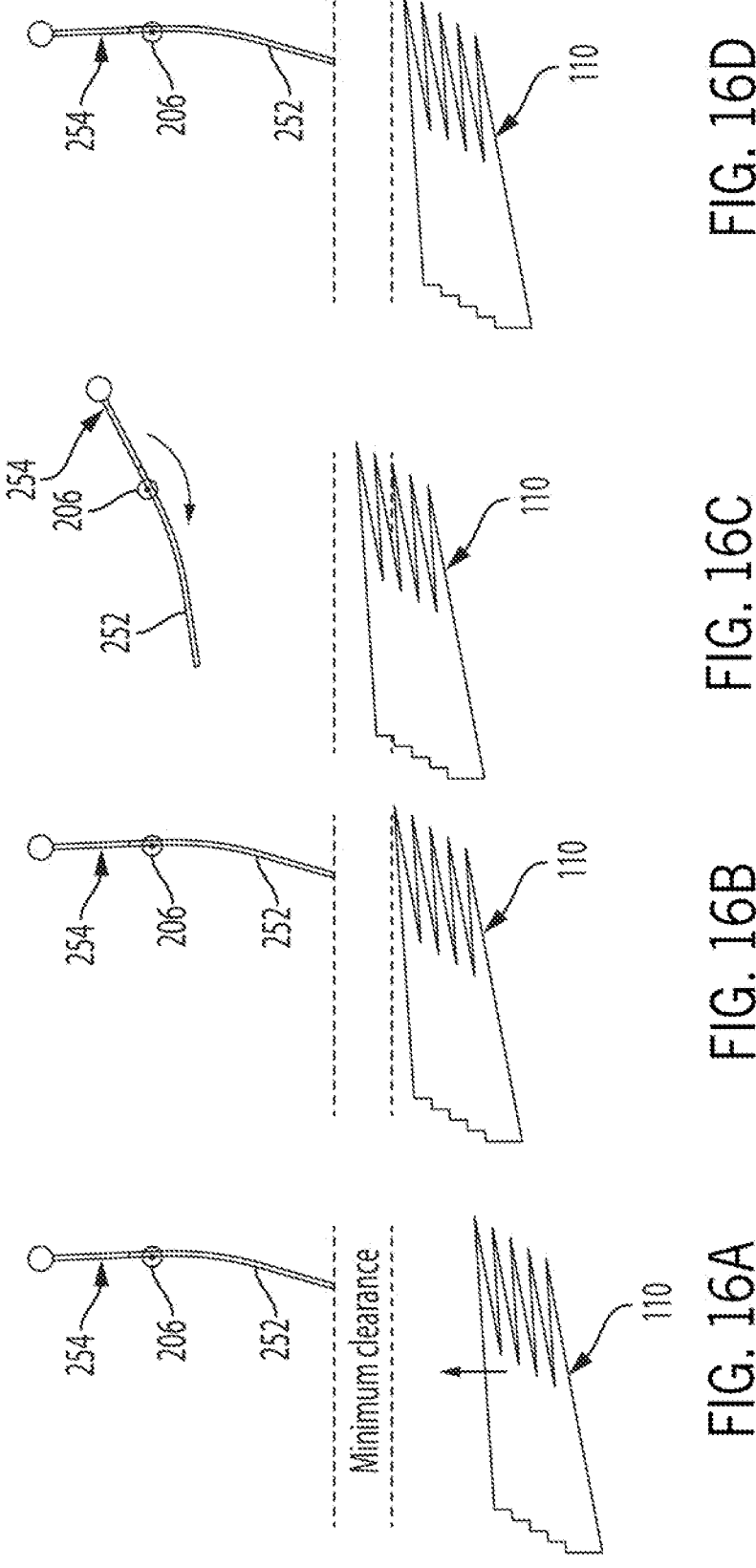
FIGS. 16A-16D are sequential schematic views of the operation of a tine bar in accordance with an exemplary embodiment of the subject disclosure as a cutterbar approaches and moves away from a harvester reel carrying the tine bar.

Referring to FIG. 16A, the cutterbar 110 is shown rising in relation to an unillustrated harvester reel but has not yet reached a minimum clearance with respect to the harvester reel. In the state shown in FIG. 16A, the tine bar 206 extends as dictated by the shape of a primary cam of the harvester reel.

Referring to FIGS. 16B and 16C, at least a portion of the cutterbar 110 reaches a minimum clearance or a predetermined clearance position with respect to the harvester reel as determined by sensor 307. As the cutter bar moves through the minimum clearance zone, the sensor 307 communicates with a controller, which communicates with an actuation system to extend a secondary cam (FIGS. 4 and 5) or a diverter 405 (FIGS. 8-14C) into contact with a follower 254 of the tine bar 206. At this juncture, the secondary cam rotates the tine bar against the bias of biasing member to a retracted position whereby the tines 252 retract with respect to the cutterbar 110 so as to avoid contact therewith. Also, at this juncture, the controller/processor/computer records the vertical position of cutterbar 110 in memory, i.e., the position of cutterbar 110 once it crossed the minimum clearance zone. This position may be referred to as an 'engage' position. The 'engage' position will be used later as a reference to establish the 'reset' position.

Referring to FIG. 16D, as the cutterbar 110 moves downwardly and away from tines, and eventually reaches the previously recorded 'engage' position (as determined by sensor(s) 307), the sensor 307 communicates with controller/processor which communicates with an actuation system to reset the tines by retracting the secondary cam or the diverter out of contact with the follower 254 of the tine bar 206. At this juncture, the biasing member biases the tine bar to rotate such that the tines 252 return to an engaged (i.e., deployed) position dictated by the primary cam. The tines may be reset based solely on the rotated position of the flex arms 111 recorded by sensor(s) 307. The previously recorded 'engage' position may be permanently stored in memory, or, alternatively, the previously recorded 'engage' position may be overwritten by the next recorded engage position such that each recorded engage position is a newly saved baseline value.

Alternatively, the controller/processor may also calculate the downward velocity or acceleration of cutterbar 110, and reset the tines to the engaged position once (i) the cutterbar 110 reaches the previously recorded 'engage' position, and (ii) the downward velocity or acceleration of cutterbar 110 exceeds a predetermined threshold.

As another alternative, the controller/processor may reset the tines to the engaged position once the downward velocity or acceleration of cutterbar 110 exceeds a predetermined threshold.

FIGS. 17A-17D illustrate sequential schematic views of the operation of a tine bar 206 in accordance with another exemplary embodiment of the subject disclosure as a cutterbar 110 approaches and moves away from a harvester reel.

Figures 17A, 17B, 17C, 17D:
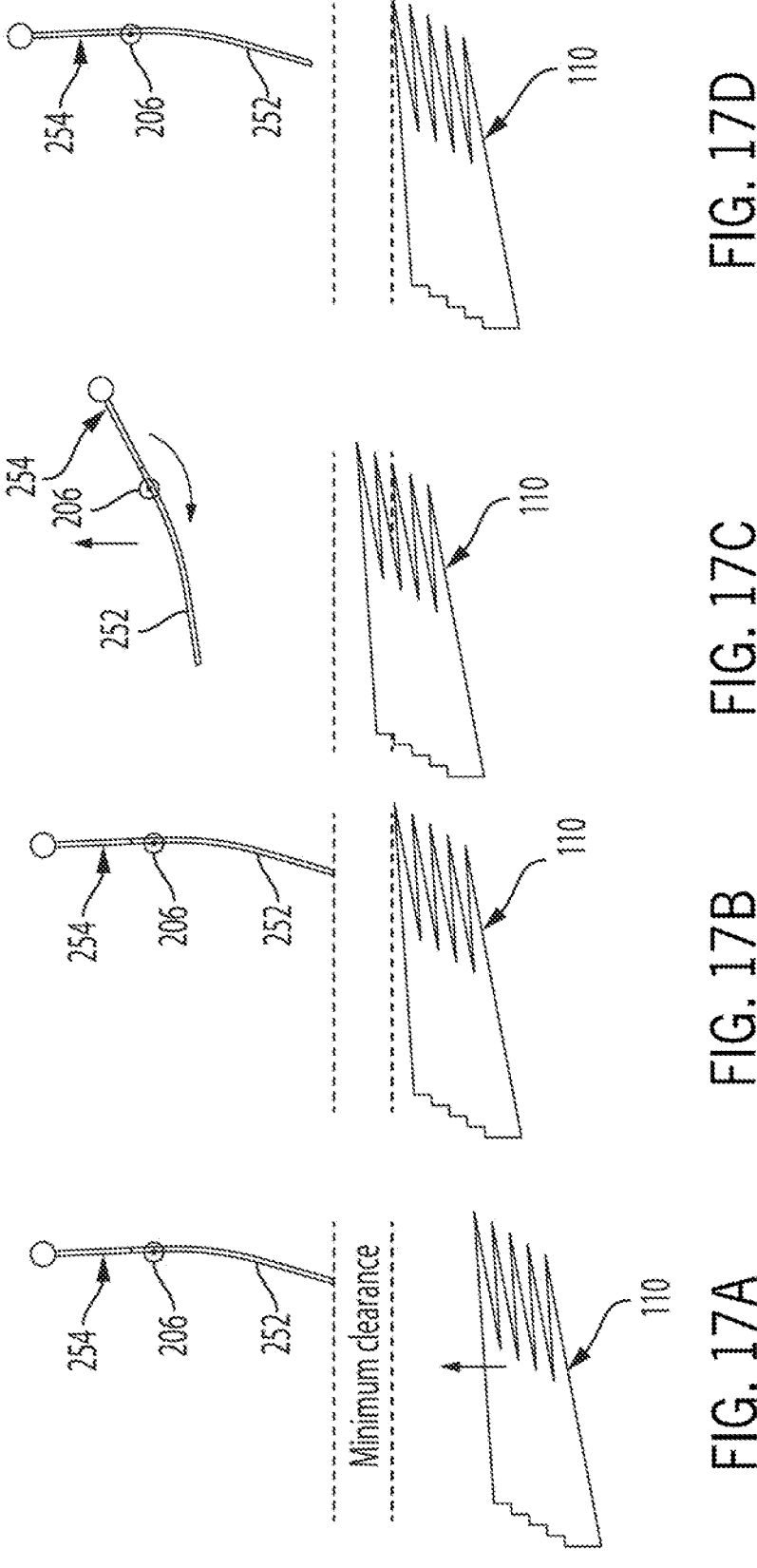
FIGS. 17A-17D are sequential schematic views of the operation of a tine bar in accordance with another exemplary embodiment of the subject disclosure as a cutterbar approaches and moves away from a harvester reel carrying the tine bar.

Referring to FIG. 17A, the cutterbar 110 is shown rising in relation to an unillustrated harvester reel but has not yet reached a minimum clearance with respect to the harvester reel. In the state shown in FIG. 17A, the tine bar 206 extends as dictated by the shape of a primary cam of the harvester reel.

Referring to FIGS. 17B and 17C, the cutterbar 110 reaches a minimum clearance or a predetermined clearance position with respect to the harvester reel as determined by a sensor 307. As the cutter bar moves through the minimum clearance zone, the sensor 307 communicates with an actuation system to extend a secondary cam (FIGS. 4 and 5) or a diverter 405 (FIGS. 8-14C) into contact with a follower 254 of the tine bar 206. At this juncture, the secondary cam rotates the tine bar against the bias of biasing member such that the tines 252 retract with respect to the cutterbar so as to avoid contact therewith. Concurrently, the sensor 307 may communicate with a reel lift actuator (FIG. 1) to raise the harvester reel relative to the cutterbar.

Referring to FIG. 17D, the reel itself may be raised thereby raising the minimum clearance zone itself if the cutterbar remains elevated due to e.g., an engaged expanse of raised ground. In that event, the reel remains raised until the sensor 307 and/or controller determines it is safe to extend the tines. Once the sensor 307 and/or controller determines it is safe to extend the tines, e.g., as the cutterbar 110 can be moved downwardly out of the minimum clearance zone, the sensor 307 communicates with an actuation system to retract the secondary cam or the diverter out of contact with the follower 254 of the tine bar 206. At this juncture, the biasing member biases the tine bar to rotate such that the tines 252 return to an engaged position dictated by the primary cam.

The computer described herein includes one or more of a processor, controller, and memory. It is to be understood that the operational steps described herein are performed by the computer upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computer described herein is implemented in software code or instructions which are tangibly stored on a tangible computer readable medium. Upon loading and executing such software code or instructions by the computer, the computer may perform any of the functionality of the computer described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It will be appreciated by those skilled in the art that changes could be made to the exemplary embodiments described above without departing from the broad inventive concept thereof. It is to be understood, therefore, that the subject disclosure is not limited to any particular exemplary embodiments disclosed, but it is intended to cover modifications within the spirit and scope of the subject disclosure as defined by the appended claims.

What is claimed is:

1. A harvester reel of an agricultural harvester header comprising:

a central rotatable shaft;

a plurality of reel tine bars extending widthwise across the harvester reel and connected to the central rotatable shaft for rotation therewith, each of the plurality of reel tine bars comprising a cam follower and a tine; and a cam assembly selectively guiding rotation of the plurality of reel tine bars;

wherein the cam assembly comprises a primary cam associated with a primary tine bar guiding mechanism and a secondary cam associated with a secondary tine bar guiding mechanism and a diverter operably attached to the secondary cam;

wherein the diverter is selectively movable between a disengaged position, in which the secondary cam does not guide rotation of the tine bars, and an engaged position, in which the secondary cam does guide rotation of the tine bars; and wherein the diverter is biased toward the engaged position and operates in conjunction with the secondary cam in pivoting the cam follower that enables retraction of the tine along a central longitudinal axis into a cammed state with the retracted tine being positioned at an acute angle to the perimeter of the harvester reel, resulting in an enlarged opening between the plurality of reel tine bars, the tine, and a cutterbar that does not enable contact between the cutterbar and the tine.

2. The harvester reel of claim 1, wherein the cam assembly further comprises:

a system that moves the diverter between the disengaged and engaged positions.

3. The harvester reel of claim 2, wherein the system comprises a biasing element being biased in moving the diverter from the disengaged position to the engaged position.

4. The harvester reel of claim 3, wherein the biasing element comprises a tension spring.

5. The harvester reel of claim 4, wherein the spring is mounted to the diverter and a fixed point on the harvester reel.

6. The harvester reel of claim 3, wherein the system further comprises:

an electromagnet mounted to a fixed point on the harvester reel, wherein the electromagnet has an active state that magnetically attracts the diverter against the bias of the biasing element, and an inactive state that does not magnetically attract the diverter.

7. The harvester reel of claim 6, wherein the electromagnet is movably mounted to a fixed point on the harvester reel in which an orientation of the electromagnet relative to the fixed point can change for mating with the diverter.

8. The harvester reel of claim 7, wherein the electromagnet includes a shaft moveably mounted to the fixed point on the harvester reel, and a compression spring positioned about the shaft that biases the electromagnet away from the fixed point on the harvester reel.

9. The harvester reel of claim 6, wherein when the diverter is positioned in the disengaged state, the electromagnet switches from the active state to the inactive state enabling the diverter to move to the engaged state under the bias of the biasing element.

10. The harvester reel of claim 6, wherein the system further comprises:

a moveable cylinder mounted to the diverter.

11. The harvester reel of claim 10, wherein a moveable end of the movable cylinder is slideably mounted in a slot formed in the diverter.

12. The harvester reel of claim 11, wherein in the engaged position of the diverter, the moveable end is positioned at a first end of the slot, and in the disengaged position, the moveable end is positioned either at or near a second end of the slot that is opposite the first end.

13. The harvester reel of claim 10, wherein the movable cylinder comprises a hydraulically powered cylinder having an internal piston.

14. The harvester reel of claim 10, further comprising:

a sensor that detects a position of the cutterbar with respect to the harvester reel, wherein the sensor is operatively in communication with the electromagnet and the moveable cylinder in moving the diverter between the disengaged position and the engaged position.

15. The harvester reel of claim 1, wherein each of the plurality of reel tine bars further comprises:

a cam follower that engages at least one of the primary cam and the secondary cam of the cam assembly.

16. The harvester reel of claim 1, wherein each of the plurality of reel tine bars further comprises a cam follower extending from the each of the plurality of reel tine bars, and wherein in the engaged position of the diverter, the secondary cam engages the cam follower of at least one of the plurality of reel tine bars pivoting the at least one of the plurality of reel tine bars about its longitudinal axis, and in the disengaged position of the diverter, the secondary cam does not engage the cam follower of the at least one of the plurality of reel tine bars.

17. The harvester reel of claim 1, further comprising:

a biasing member that biases each reel tine bar to rotate about the central longitudinal axis of the each reel tine bar.

18. The harvester reel of claim 1, wherein in the engaged position, the cam follower of at least one of the plurality of reel tine bars is positioned in the cammed state against the diverter and the secondary cam upon rotation of the central rotatable shaft.

19. An agricultural harvester header comprising:

a central rotatable shaft;

a plurality of reel tine bars extending widthwise across a harvester reel and connected to the central rotatable shaft for rotation therewith, each of the plurality of reel tine bars comprising a cam follower and a tine;

a cam assembly selectively guiding rotation of the plurality of reel tine bars, wherein the cam assembly comprises a primary cam associated with a primary tine bar guiding mechanism and a secondary cam associated with a secondary tine bar guiding mechanism and a diverter operably attached to the secondary cam, wherein the diverter is selectively movable between a disengaged position, in which the secondary cam does not guide rotation of the tine bars, and an engaged position, in which the secondary cam does guide rotation of the tine bars, and wherein the diverter is biased toward the engaged position and operates in conjunction with the secondary cam in pivoting the cam follower that enables retraction of the tine along a central longitudinal axis into a cammed state with the retracted tine being positioned at an acute angle to the perimeter of the harvester reel, resulting in an enlarged opening between the plurality of reel tine bars, the tine, and a cutterbar that does not enable contact between the cutterbar and the tine; and the cutterbar arranged below the harvester reel.

20. An agricultural harvester with an agricultural harvester header comprising:

a central rotatable shaft;

a plurality of reel tine bars extending widthwise across a harvester reel and connected to the central rotatable shaft for rotation therewith, each of the plurality of reel tine bars comprising a cam follower and a tine;

a cam assembly selectively guiding rotation of the plurality of reel tine bars, wherein the cam assembly comprises a primary cam associated with a primary tine bar guiding mechanism and a secondary cam associated with a secondary tine bar guiding mechanism and a diverter operably attached to the secondary cam, wherein the diverter is selectively movable between a disengaged position, in which the secondary cam does not guide rotation of the tine bars, and an engaged position, in which the secondary cam does guide rotation of the tine bars, and wherein the diverter is biased toward the engaged position and operates in conjunction with the secondary cam in pivoting the cam follower that enables retraction of the tine along a central longitudinal axis into a cammed state with the retracted tine being positioned at an acute angle to the perimeter of the harvester reel, resulting in an enlarged opening between the plurality of reel tine bars, the tine, and a cutterbar that does not enable contact between the cutterbar and the tine; and the cutterbar arranged below the harvester reel.

\* \* \* \* \*

16